Dec. 25, 1945.   G. E. STEVENSON   2,391,652
TIRE INFLATING DEVICE
Filed Feb. 17, 1941
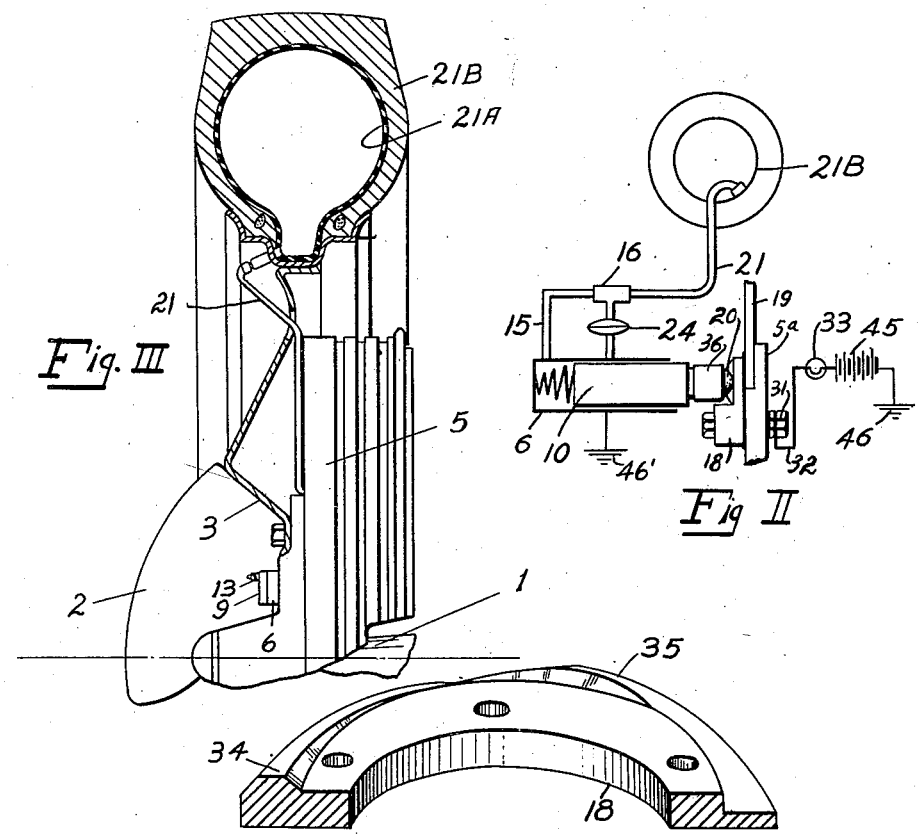
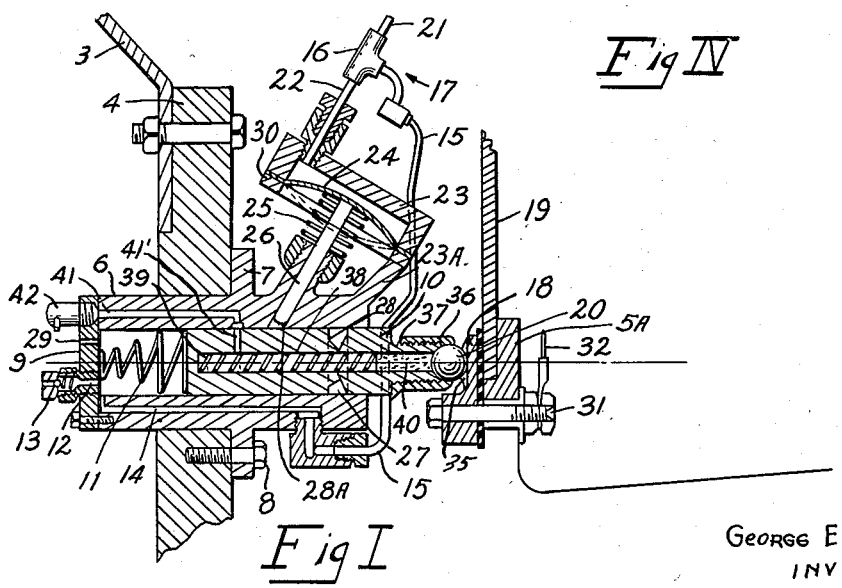
George E. Stevenson
INVENTOR
ATTORNEY Patented Dec. 25, 1945

2,391,652

UNITED STATES PATENT OFFICE 2,391,652

TIRE INFLATING DEVICE

George E. Stevenson, Coquille, Oreg.

Application February 17, 1941, Serial No. 379,324

3 Claims. (Cl. 152—421)

My invention relates to an automatic pump and pressure equalizer for pneumatic tires.

The invention has for its primary purpose and object the maintaining of the desired pressure within pneumatic tires.

The invention is comprised primarily of a cylinder having a piston disposed therein and having a diaphragm contiguous thereto with the two working in unison to place the piston rod of the pumping piston in registry alignment with and in contact with a cam disposed upon a fixed member disposed within the wheel to thereby place the pumping piston and rod in position for contacting the cam and for pumping air into the pneumatic tire when the pressure within the tire has dropped below a predetermined pressure.

Pneumatic tires are manufactured to give the greatest mileage when run having a predetermined internal pressure. This pressure is checked periodically or semi-occasionally to determine the pneumatic pressure within the tire. This often varies to large extents, thereby lessening the mileage to be obtained from the tire and also to increase the hazard or the likelihood of tire difficulties due to a drop in pneumatic pressure within the tire.

Through the use of my new and improved device, the desired pressure within a very limited range is maintained automatically within the pneumatic tire at all times to thereby assure the user of the car the greatest cushioning pressure from the tire and the longest life in the use of the tire. In order to further increase the utility of my device I create an electric hookup within each of the tire instrumentalities and run an electric circuit therefrom to some convenient place within the line of vision of the driver of the vehicle and place a lamp within the circuit within the vision of the driver or operator to thereby visually indicate to the driver which one of the tires is developing an abnormally low pressure. The frequency of such development is also indicated to thereby provide an ocular and visible tell-tale, and at all times indicate to the driver of the vehicle the abnormal pressure developed within the tire and within which one of the tires.

A further object of my invention consists in constructing the pump and its related parts so that the same will be practically free from operating mechanical annoyances and one that will have a long and useful life.

A still further object of my invention consists in so constructing the same that at the point of origin of the device, price will not be a deterrent in its adoption and use.

A still further object of my invention is to increase the safety of pneumatic tires when run at the high rates of speed that the modern automobile is capable of and at which speed the same is frequently run.

A still further object of my invention consists in placing within the device suitable means for preventing the over-development of pressure within the pneumatic tire. This abnormal pressure may be occasioned by high speed driving, by hot sun and other frictional and thermal heat causes.

A still further object of my invention is to increase the useful life of the tire due to the running of the same at the prescribed pneumatic pressure at which the tire is designed to run by the manufacturer.

A still further object of my invention consists in so constructing the same that it will be placed within the wheel or immediately adjacent thereto wherein and whereby the same will be practically free from damage due to the rotation of the wheel upon which the tire is placed and with the pumping instrumentalities being placed within the wheel.

A still further object of my invention consists in so constructing the device and in suitably placing the same to require a limited amount of distribution of material to maintain the wheel in suitable dynamic balance.

With these and incidental objects in view, the invention consists in certain novel features of construction and combination of parts, the essential elements of which are set forth in the appended claims, and a preferred form of embodiment of which is hereinafter shown with reference to the drawing which accompanies and forms a part of this specification.

In the drawing:

Fig. I is a sectional side view of the assembled device. In this view the device is shown in place in an automotive wheel with the wheel being shown in fragmentary sectional view.

Fig. II is a schematic layout of the assembled device illustrating the flow of compressed air from the pump to the tire and illustrating the pump as having an electric circuit associated therewith, with the lamp being disposed within the circuit and indicating through lamp that the pump is being actuated.

Fig. III is a fragmentary, partially sectional view of a tire and wheel illustrating one of my new and improved devices in place upon the wheel and in communication with the tube of the tire and for supplying air under pressure into the tube of the tire.

Fig. IV is a sectional perspective view of the cam that is placed in registry with the pumping unit and for imparting a reciprocating motion to the piston of the pump when the piston is in end engagement with the cam.

Like reference characters refer to like parts throughout the several views.

I have shown my device as being disposed within the wheel of a motor vehicle with the wheel being suitably mounted upon an axle 1, the wheel being of the conventional type having a hub cap 2 and an outer removable face plate 3. The primary flange 4 of the wheel is of the conventional type and the brake drum plate 5 is of the conventional type.

I drill or otherwise make a hole in the brake backing plate 19 and I place thereover a frame member 5a to which are mounted my pump actuating instrumentalities. The pump is primarily comprised of a cylinder 6 having a flange 7 formed upon its outer surface to facilitate the attachment of the cylinder to the wheel with the flange and cylinder being secured to the frame by any suitable fastening means as through the use of a cap screw 8.

A removable head 9 is provided for the cylinder. A piston 10 is reciprocably disposed within the cylinder. A spring 11 is disposed between the cylinder head and the piston head, the function of which is to normally maintain the piston in a retracted position. The piston is made relatively long to eliminate the necessity for piston rings and the like. The fit between the piston and the cylinder is a precision fit to prevent undue leaks of air between the piston and the cylinder when the piston is functioning as a pumping piston.

An intake port 12 admits air into the interior of the cylinder and between the piston head and the cylinder head. An intake valve 13 is provided to permit the passing of air through the port 12 in one direction only.

An exhaust port 14 is provided. The exhaust port 14 is in communication with a pipe or tube 15 that conducts pumped air to a T-fitting 16. A one-way valve 17 is placed within the tube or pipe 15 to limit the air passing through the tube or pipe 15 to flowing in one direction only. Pumping action is imparted to the piston 10 by a cam 18. The cam 18 is removably secured to the frame member 5a.

The face of the cam 18 is engaged by a ball 20 disposed in the end of the piston 10 to limit friction between the piston and the cam and to insure a smooth action. As long as the ball 20 is in contact with the cam 18 the piston will function as a pumping piston. When the ball 20 is out of contact with the cam 18 the piston 10 will become inoperative and cease to be a pumping piston. Pumped air is delivered into the distributor head 16. Pumped air flows from the head 16 through a suitable pipe or tube 21 to the inner tube 21a of the pneumatic tire 21b. Pumped air flows from the distributor head 16 through a suitable piping connection 22 to a cylinder 23. The cylinder 23 is secured to the frame of the cylinder 6 illustrated at 23a by any suitable connecting means. The cylinder 23 has a diaphragm being of the spring action type with a balanced calibrated spring 25 being disposed about the stem 26 that is secured to the diaphragm 24. The diaphragm disk 24 is normally in the position as illustrated in Fig. I in full line position, but when an excess or above normal pressure is developed within the tire, the diaphragm disk 24 will automatically be placed into the dotted position as illustrated in Fig. I. In doing so the stem 26 secured to the disk 24 is made to engage the wall of the piston 10. The piston 10 has a relatively wide groove 27 disposed within its outer surface. The inner end of the stem 26 is rounded. When the maximum desired pressure has been developed within the tire for which the disk 24 and the spring 25 have been calibrated to act, the disk 24 moves into the dotted position as illustrated in Fig. I. The rounded end 28a of the stem 26 contacts the inclined surface 28 of the piston and moves the piston longitudinally sufficiently to break the contact between the ball 20 and the cam 18 to thereby render the piston inactive. It then ceases to be a pumping piston. It remains in this condition until the pressure within the tire and within the cylinder 23 drops to the predetermined set position at which the calibrated spring 25 and the diaphragm or disk 24 return to normal position at which time the stem 26 moves from engagement with the groove 27 of the piston and the same is returned to pumping position through the action of the spring 11.

A bleeder vent 29 is provided to prevent excess pressure developing in the pumping cylinder. The area of the bleeder is less in area than the exhaust port disposed at the exhaust end of the pumping cylinder 9. A head 30 is provided. The head 30 maintains the diaphragm 24 in engagement with the end of the cylinder 23 and forms a tight leak-proof connection therewith when tightened there against in the usual manner.

In order that lights may be suitably placed upon the dash of the vehicle or within line of vision of the operator of the vehicle, I provide an electric terminal 31 upon the cam 18. When the piston is a pumping piston the electric conductor 32 leading from the electric terminal 31 is energized from a source of electric energy as the battery 45. The conductor is grounded at 46 to the frame of the car to thereby luminate a lamp 33 in the line of vision of the operator of the vehicle to indicate that there is an abnormal leak in the tire by the frequent recurrence of the light being lighted. When the ball 20 is in contact with cam 18, current flows from battery 45 to lamp 33, through wire 32 and the parts of the pump which are grounded at 46', and then from ground 46 back to the battery.

The cam 18 may have a number of actuating surfaces here illustrated at 34 and 35, or it may be limited to one, depending upon the diameter of the tire and the pressure to which the same is to be pumped. In the smaller pleasure type cars, the number of actuating surfaces may be limited to one; in medium sized cars the surfaces may be two; and in the heavier type of passenger cars carrying larger tires there may be three or more actuating surfaces upon the cam. Whereas in trucks, buses, and other types carrying fairly high pressures in their tires, the actuating surfaces upon the cam may be four or more. Therefore, it is possible in a single unit of pump made in a single size to accommodate a wide range of uses because of the number of actuating surfaces upon the cam 18.

The stem 26 and the bottom of groove 28 are oppositely inclined so that the stem will have a camming action on the bottom of said groove to effect projection and retention of the piston out of contacting relation to the cam ring 18 when the pressure-responsive element 24 is subjected to pressure from pipe 21 above a predetermined degree. To properly position the ball 20 within the outer end of the piston 10 I provide a cap 36. I form a threaded engagement between the cap 36 and the restricted end 37 of the piston. I have found it desirable to drill a longitudinal hole 38 within the piston 10. I place a spring 39 within the hole. I place a cylindrical wick 40 within the hole and fill the hole and the wick with a lubricant to lubricate the ball 20 and the cam surface when the piston is a pumping piston. A port 41 is formed within the cylinder and the same communicates with the interior of the cylinder. The piston 10 has a transverse passage 41' leading from the hole or bore 38 to the outer surface of the piston and adapted to be registered with the port 41 when the piston is in the position of Figure 1. Suitable means may be employed to facilitate rotary adjustment of the piston so that the passage 41' will register with port 41 when it is desired to supply lubricant to wick 40. A suitable grease connection 42 is disposed within the outer end of the port 41 to facilitate the forcing of a lubricant through the latter and passage 41' of the piston into the hole 38 and in and around the piston itself. This also permits some freedom in positioning the location of the cam upon the plate 19.

While the form of mechanism herein shown and described is admirably adapted to fulfill the objects primarily stated it is to be understood that it is not intended to confine the invention to the embodiment herein shown and described, as it is susceptible of embodiment in various forms, all coming within the scope of the claims which follow.

What I claim is:

1. In a device of the class described comprising in combination a cylinder, a piston reciprocably disposed in the cylinder, a cam, a ball disposed within the end of the piston and normally in engagement with the cam, the piston being tubular for the major portion of its length, a wick within the tubular portion of the piston and in contact with the ball, means for maintaining the wick in contact and under pressure with the ball, means for delivering lubricant to the cylinder wall into the tubular portion of the piston, a second cylinder, piping instrumentalities communicating the two cylinders with each other, a diaphragm disposed within the second cylinder, a stem carried by the diaphragm adapted for being moved in one direction when pressure of predetermined amounts is developed within the second cylinder, and said stem coacting with the piston for locking the piston in full advanced position within the cylinder when the diaphragm is so actuated.

2. In an automobile, the combination with an axle having a wheel mounted thereon, said wheel including a hub having a flange provided with an opening, a pump cylinder removably fitted in and projecting through said opening parallel with and adjacent said axle, means to removably secure the pump cylinder to the hub flange, a piston operatively arranged in said pump cylinder, a fixed brake backing plate arranged inwardly of said pump cylinder, a cam ring secured to said brake backing plate concentrically of said axle and a spring acting to retract the piston in operative engagement with said cam ring, said pump cylinder being provided with a longitudinal air discharge passage in the wall thereof having its outlet end opening through said wall at a point inwardly of the hub flange, and a pipe for connecting the outlet end of said passage with the inner tube of the wheel tire.

3. In an automobile, the combination with an axle having a wheel mounted thereon, said wheel including a hub having a flange provided with an opening, a pump cylinder mounted in said opening parallel with and adjacent said axle, means to secure the pump cylinder to the hub flange, a piston operatively arranged in said pump cylinder, a fixed brake backing plate arranged inwardly of said pump cylinder, a cam ring secured to said brake backing plate concentrically of said axle and a spring acting to retract the piston in operative engagement with said cam ring, said pump cylinder being provided with a longitudinal air discharge passage in the wall thereof having its outlet end opening through said wall at a point inwardly of the hub flange, and a pipe for connecting the outlet end of said passage with the inner tube of the wheel tire, a control cylinder mounted on the pump cylinder inwardly of said hub flange and having an inlet connected to said pipe, a spring pressed pressure-responsive element in said control cylinder and having a stem extending through the pump cylinder into contact with said piston, said piston having a groove movable past the inner end of said stem, the stem and the bottom of said groove being oppositely inclined so that said stem will have a camming action on the bottom of the groove to effect projection and retention of the piston out of contacting relation to the cam ring when said pressure-responsive element is subjected to pressure in said pipe above a predetermined degree.

GEORGE E. STEVENSON.